United States Patent [19]

Nerthling

[11] 3,823,660

[45] July 16, 1974

[54] RADIANT TUNNEL
[76] Inventor: Carl H. Nerthling, 1026 W. 35th St., Erie, Pa. 16508
[22] Filed: Oct. 2, 1972
[21] Appl. No.: 293,762

[52] U.S. Cl.................. 99/386, 99/391, 99/443 C, 126/41 C
[51] Int. Cl. ............................................ A47j 37/04
[58] Field of Search.......... 99/331, 386, 393, 443 C, 99/387, 389, 390, 391, 392; 126/41 R, 41 C; 219/388

[56] References Cited
UNITED STATES PATENTS

| | | |
|---|---|---|
| 784,854 | 3/1905 | Grace .............................. 99/386 X |
| 1,171,122 | 2/1916 | Hill ...................................... 99/386 |
| 1,458,021 | 6/1923 | Bamford .......................... 99/386 X |
| 1,518,811 | 12/1924 | Murray ................................. 99/386 |
| 2,142,390 | 1/1939 | Zerr..................................... 99/386 |

Primary Examiner—Billy J. Wilhite
Attorney, Agent, or Firm—Bean & Bean

[57] ABSTRACT

A device for cooking meat products and in particular solid frozen hamburger patties within less than a minute without loss of flavor and juices; the device employing gas burner heated metal screens vertically bounding a hamburger patty transport conveyor.

12 Claims, 4 Drawing Figures

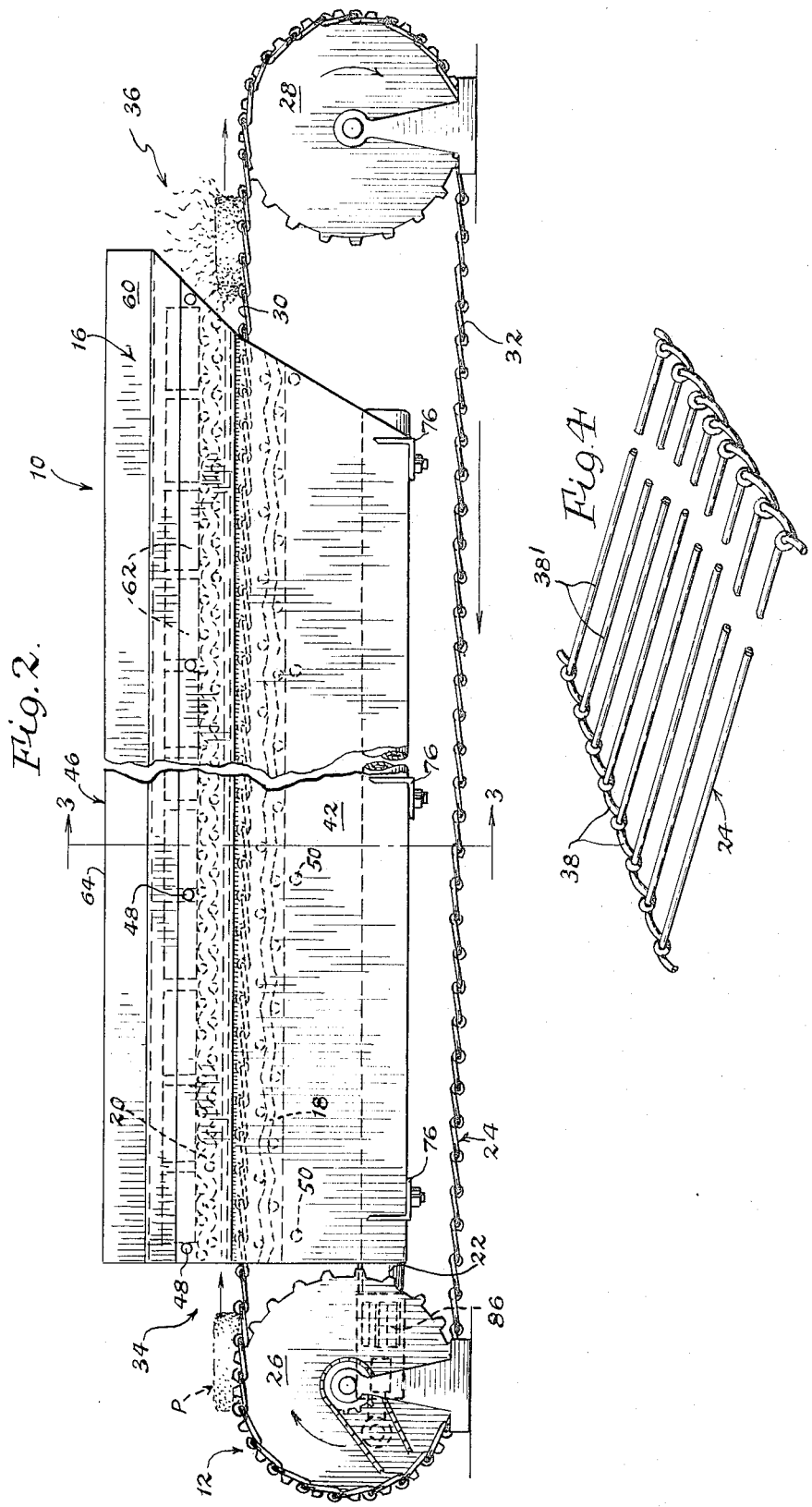

RADIANT TUNNEL

BACKGROUND OF THE INVENTION

The supply of meat products, such as hamburger patties, to restaurants or like eating establishments specializing in high volume service has heretofore presented serious economic and health problems. In this respect, the supply of hamburger patties under refrigeration temperatures has permitted same to be moved directly from refrigeration storage to a cooking device or broiler, as dictated by volume requirements. However, normal refrigeration temperatures are not sufficiently low to arrest bacterial growth and thus in order to satisfy present day health requirements relative to permissive bacteria contamination, shipments of fresh hamburger patties must be delivered to the restaurant every other day or so.

Proposals have been made to minimize supply costs by making deliveries of hamburger patties frozen to a point sufficient to prevent bacteria growth (between about −35° and −50°F) on a once a week basis. This has heretofore not been practical for the reason that commercially available cooling devices of which I am aware are unable to properly cook solidly frozen hamburger patties within the normal 1 minute time interval dictated by high volume service requirements. Moreover, experience has shown that attempts to modify presently available cooking devices as by merely increasing their heat output or by impinging burner flames directly on the surface of the patties, will not lead to a satisfactory solution of the problem of cooking solid frozen hamburger patties in that the resultant products are either dried out or their surfaces are charred and centers uncooked.

SUMMARY OF THE INVENTION

The present invention relates to a device for quickly cooking meat products and more particularly solid frozen hamburger patties within less than one minute without the loss of flavor and juice.

More specifically, the cooking device of the present invention features the utilization of a pair of metal screen devices arranged within an open ended cooking tunnel in parallel relationship with opposite sides of a run of an open grip type conveyor adapted to transport hamburger patties through the tunnel in combination with a gas fired heater unit for maintaining the screen devices at a temperature at which they predominately emit infrared radiation. Preferably, the heater unit includes a primary burner or burners arranged to direct its flame upwardly against the lower surface of a lowermost of the screen devices and a secondary burner arranged to direct its flame upwardly against the lower surface of an uppermost of such screen device; the tunnel being formed with an exhaust port adjacent a side thereof remote from the secondary burner whereby to cause its flame to pass transversely of and in contact with the lower surface of the uppermost screen device.

The lower screen device has a coarser weave and is of lighter weight than the upper screen device in order to provide for uniform searing of the outer surface of the hamburger patties and subsequent proper cooking of the interior thereof. It has been found that only the primary burner need be employed for low volume requirements, that is, wherein the hamburger patties being cooked do not substantially cover the conveyor run. However, high volume requirements dictate the utilization of both primary and secondary burners, and as a practical matter it is preferable to normally operate both burners and to adjustably vary the supply of combustion gas thereto and thus their output in accordance with the temperature of gases exhausted from the cooking device.

DRAWINGS

The nature and mode of the present invention will now be more fully described in the following detailed description taken with the accompanying drawings wherein:

FIG. 2 is a side elevational view of the device illustrated in FIG. 1;

FIG. 4 is a perspective view of a conveyor belt employed in the present cooking device.

DETAILED DESCRIPTION

Figure 1:
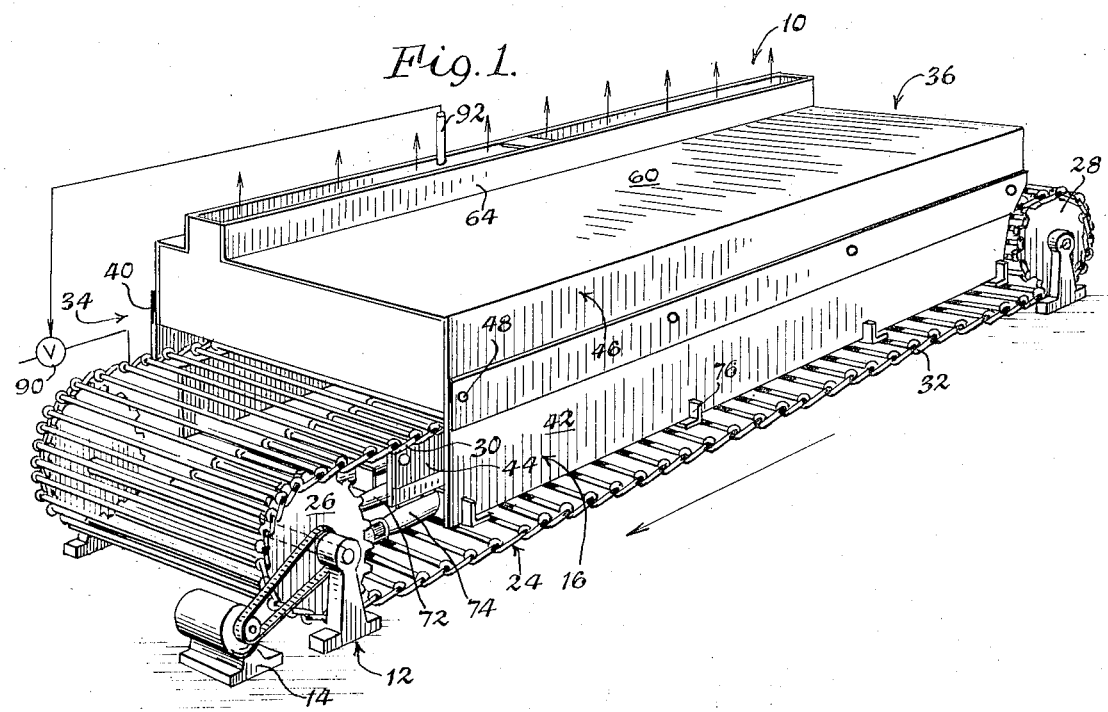
FIG. 1 is a perspective view of the cooking device of the present invention.

The cooking device of the present invention, which generally is designated as 10 in FIGS. 1 and 2 will now be described, as by way of specific illustration, as having particular utility in the cooking of variable quantities of hard or solidly frozen (−35° to −50°F) quarter pound hamburger patties P within a period of less than one minute. As will become apparent, the invention features novel apparatus making commercially practical the utilization of infrared radiation to quickly sear all outer surfaces of the patties in order to seal in juices and flavor and then to properly cook the insides of the patties without objectional drying of such outer surfaces.

More specifically, device 10 includes a conveyor 12 driven by a suitable means, such as an electric motor 14; an open ended, essentially horizontally elongated cooking tunnel 16; first or lower and second or upper screen devices 18 and 20, respectively, which are arranged to extend in a horizontally disposed, vertically spaced relationship lengthwise within tunnel 16; and a gas fired heater assembly 22.

Conveyor 12 is shown in FIGS. 1–4 as being in the form of an endless open grid type belt 24, which is trained about a driven sprocket device 26 and an idler sprocket device 28 to define horizontally disposed, vertically spaced hamburger patty transport or upper and return or lower runs 30 and 32, respectively. Transport run 30 is arranged vertically intermediate screen devices 18 and 20 and extends outwardly through the open ends of tunnel 16 to define feed and discharge ends 34 and 36, respectively, of cooking device 10. Manual or automatic means, not shown, may be employed to place frozen hamburger patties on the conveyor adjacent end 34 and remove fully cooked hamburgers adjacent end 36. Belt 24 is best shown in FIG. 4 as being fabricated from a plurality of movably end joined, essentially U-shaped links 38, which may be formed of any suitable heat resistant, readily cleanable material. The spacing between the mid or transverse portions 38' of adjacent links may vary as long as the links provide adaquate support for the hamburger patty without shielding same from heat radiating from below or interfering with the upward flow of products of combustion produced by heater assembly 22. It will be appreciated that belts of this general construction are well known, as evidenced by U.S. Pat. No. 2,238,309, and thus forms no part of the present invention.

Figure 3:
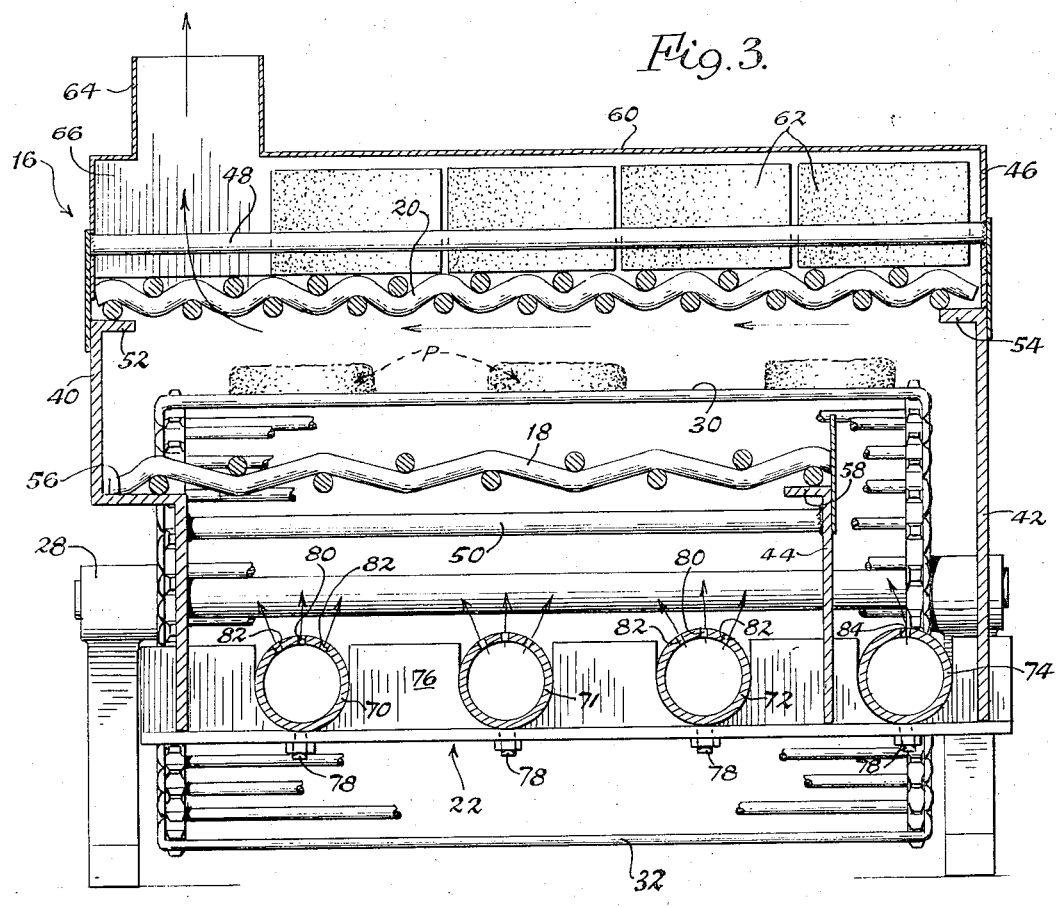
FIG. 3 is a sectional view taken generally along line 3—3 in FIG. 2.

Now referring to FIGS. 1–3, it will be seen that tunnel 16 is defined by a pair of upstanding, horizontally elongated metal side walls 40 and 42; an upstanding horizontally elongated support wall 44 arranged intermediate the side walls; a top wall assembly 46 for joining upper marginal edge portions of the side walls; and transversely extending, horizontally disposed connecting rods 48 and 50 for bracing assembly 46 and for rigidly joining side wall 40 to support wall 44, respectively. More specifically, side walls 40 and 42 are best shown in FIG. 3 as being formed with inturned, horizontally disposed, integrally formed support flanges 52 and 54, respectively, which serve to bottom support opposite marginal edge portions of upper screen device 20. Side wall 40 is also "stepped" to define a lower support flange 56, which cooperates with a horizontally disposed support flange 58 formed integrally with an upper marginal edge of support wall 44 to bottom support opposite marginal edge portions of lower screen device 18. This arrangement permits the screen devices to "float" or undergo unrestricted thermal expansion transversely of tunnel 16.

Top wall assembly 46 is best shown in FIGS. 1 and 3 as including an inverted U-shaped sheet metal top wall portion 60, which is edge joined to the upper marginal edges of side walls 40 and 42 and layer of refractory material, such as may be defined by a plurality of bricks 62 arranged to rest on the upper surface of upper screen device 20. Top wall portion 60 serves to define an elongated exhaust port 64, which is arranged to extend lengthwise of the tunnel adjacent side wall 40 and preferably connected to forced draft exhaust, not shown; bricks 26 being spaced from such side wall to define a passageway 66 arranged in vertical alignment with port 64. In my presently preferred construction, bricks 62 serve to block essentially all flow of products of combustion through screen device 20, except in the area of passageway 66.

Screen devices 18 and 20 are preferably woven from Inconel or other metal wires characterized as being capable of being heated to an extremely high temperature without damage, such as 1,600°F., and when so heated being adapted to emit radiation substantially wholly within the infrared range.

For proper operation, the screen devices should be of essentially uniform weave in order to achieve essentially uniform heating characteristics within the tunnel. Also, the mesh size of screen 18 must be sufficiently large to permit relatively unimpeded passage of products of combustion upwardly therethrough and to avoid "heat screening" of screen device 20, while still having a sufficient weight of metal and number of wires per inch to provide for retention of heat or the "residual load" capability required for proper cooking conditions. It has been found that the use of excessively large mesh sizes or the complete removal of screen device 18 is undesirable from the standpoint that the required cooking time for a given tunnel length and rate of conveyor travel is substantially lengthened and the surface of the patty is subjected to severe drying and/or charring. It has also been found that upper screen device 20 should be heavier and have a finer weave or mesh size than screen device 18 in order to provide a greater heat retention capability and radiation efficiency. However, the use of a very tightly woven screen or the replacement of the upper screen device with a flat plate, even if apertured, will lead to a substantially lengthening of the time required for cooking and result in drying out of the patty.

Heater assembly 22 includes a primary heater unit having for instance three elongated gas fired burners 70–72 arranged intermediate side wall 40 and support wall 44 for applying heat directly to the lower surface of screen device 18, and a secondary elongated gas fired burner 74 arranged intermediate support wall 44 and side wall 42 for applying heat directly to the lower surface of screen device 20 through an "overhanging" marginal edge portion of conveyor run 30; screen device 20 also being indirectly heated by burners 70–72. Preferably, the burners are fixed relative to tunnel 16 and the tunnel further rigidified by means of a plurality of slotted angle iron mounts 76, which extend transversely between and are affixed to lower marginal edge portion side walls 40 and 42 and are apertured to receive threaded studs 78 weld affixed to the lower surface of each burner.

Preferably, burners 70–72 are formed with a line of central discharge apertures 80 and a pair of lines of side discharge apertures 82, the latter being spaced through approximately a 60° arc in order to achieve a desired flame geometry to be described. On the other hand, burner 74 is formed with only a line of central discharge apertures or a single slot 84 with a view towards projecting its associated flame upwardly towards screen device 20; such flame being effectively blocked from passage therethrough by bricks 62 and as a result being turned or bent for passage transversely along the lower surface of the screen device towards port 64. Each burner is otherwise of conventional construction including an adjustable primary air aspirator or pre-mix control device 86, shown only in FIG. 2.

In a preferred form of the present invention, a commercially available combustible gas is supplied to the burners under the control of a valve device 90, which is in turn adjustably controlled by a suitable exhaust gas temperature sensor 92 mounted within port 64 or a communicating exhaust stack, not shown. As indicated above, it is preferable to provide a fan, not shown, to create a forced draft within port 64 with a view towards achieving the best burner flame geometry by increasing the supply of secondary air entering through the open ends of tunnel 16 over that which would be achieved by convective forces alone.

The provision of adequate amounts of secondary air in combination with the above described aperture geometry of burners 70–72 ideally results in the production of illuminous flame, which will break at the lower surface of screen device 18; any unburned gas resulting from an increase in the volume of gas supplied to such burners over a minimum operating volume being subsequently burned above the screen as a plurality of small flames aligned with the screen apertures. The minimum operating volume will be determined by the requirement that screen device 18, as well as screen device 20 be maintained within an acceptable infrared radiating temperature range between about 1,550° and 1,625°F. (preferably 1,600°F.) for a given minimum operating load, that is, a given number of frozen hamburger patties (frozen for instance at between −35° and −50°F.) passing through the tunnel at a given rate. As the operating load increases, as by increasing the number of hamburger patties applied to a constant speed conveyor to satisfy the requirements of a high volume period of sales, there is a tendency for the temperature of both screen devices to fall below the acceptable temperature range and this is reflected in the reduction of the temperature of the exhaust gases sensed by sensor 92. In response to the reduction of the temperature of the exhaust gases, sensor 92 serves to open valve 90 and thus increase the flow of combustible gases to the burners with the result that the screen devices are maintained within or returned to their acceptable temperature range.

As by way of example, in one commercial form of the present cooking device, the tunnel has a length on the order of about 3½ feet and a width of less than 1 foot; the screen devices are placed about 2 inches apart and are woven from about 0.135 inch diameter Inconel wire with screen device 18 having 2½ wires per inch and screen device 20 having 4 wires per inch; and the conveyor is driven at a constant speed to transport the hamburger patties through the tunnel. In less than a minute and ideally in about 48 seconds, a solidly frozen hamburger patty (−50°F.) was cooked to obtain a hamburger "perfect" in appearance and taste. On at least one occasion this cooking device was employed to cook approximately 500 hamburgers within a space of 1 hour. The above example is given for an installation employing a forced draft exhaust; it being understood that the mesh size of screen device 20 may be slightly enlarged to about 3½ or even 3 wires per inch with slight decrease in cooking efficiency in order to maintain proper burner operating conditions for convective draft installations.

I claim:

1. A food product cooking device comprising in combination:
   means defining an open ended horizontally elongated tunnel;
   an endless open grid type belt conveyor having a horizontally disposed supporting run arranged to transport said food product lengthwise through said tunnel;
   first and second metal screen devices arranged within said tunnel in a spaced essentially parallel relationship with lower and upper surfaces of said conveyor run, respectively, one marginal edge of said conveyor run extending transversely beyond said lower screen device to define an overhang extending lengthwise of said conveyor run; and
   heater means for heating said screen devices to within a range at which said screen devices emit substantial infra red radiation, whereby to impart heat to said food product during transport thereof through said tunnel, said heater means including a main gas heater arranged to direct a flame upwardly towards a lower surface of said first screen device and a secondary gas heater arranged to direct a flame upwardly towards said second screen device through said conveyor run overhang.

2. A device according to claim 1, wherein said tunnel includes an exhaust opening extending lengthwise thereof above said second screen device adjacent a marginal edge of said conveyor run opposite from said overhang, and refractory material is arranged to overlie said second screen device and at least partially bounds a passageway communicating with said exhaust opening.

3. A device according to claim 2, wherein said first screen device is coarsely woven and of light weight relative to said second screen device.

4. A food product cooking device comprising in combination:
   means defining an open ended tunnel, said tunnel being horizontally elongated and including a pair of lengthwise extending side walls, a top wall means joining said side walls and defining an elongated exhaust port extending lengthwise of said tunnel adjacent one of said side walls, and lengthwise extending support means arranged adjacent another of said side walls;
   an endless open grid type belt conveyor having a horizontally disposed supporting run arranged to transport said food product through said tunnel;
   first and second metal screen devices, said side walls having support flanges for supporting lengthwise extending marginal edges of said second screen device whereby to support said second screen device in an essentially horizontally disposed relationship vertically below said top wall means in a spaced essentially parallel relationship with an upper surface of said conveyor run, said one side wall and said support means having support flanges for supporting lengthwise extending marginal edges of said first screen device whereby to support said first screen device in a spaced essentially parallel relationship with a lower surface of said conveyor run; and
   heater means for heating said screen devices to within a range at which said screen devices emit substantial infra red radiation, whereby to impart heat to said food product during transport thereof through said tunnel, said heater means including a main gas heater arranged intermediate said one side wall and said support means for directing a flame upwardly towards a lower surface of said first screen device and a second gas heater arranged intermediate said support means and said other side wall for directing a flame upwardly towards a lower surface of said second screen device, and said top wall means includes refractory material disposed immediately above said second screen device and spaced from said one side wall to define a flow opening in vertical alignment with said exhaust port.

5. A device according to claim 4, wherein said first screen device is coarsely woven and of light weight relative to said second screen device.

6. A food product cooking device comprising in combination:
   means defining an open ended tunnel, said tunnel being horizontally elongated and including a pair of lengthwise extending side walls, a top wall joining said side walls and defining an elongated exhaust port extending lengthwise of said tunnel adjacent one of said side walls, lengthwise extending support wall arranged adjacent another of said side walls;

an endless open grid type belt conveyor having a horizontally disposed supporting run arranged to transport said food product through said tunnel;
   first and second metal screen devices, said first screen device being more coarsely woven and of lighter weight than said second screen device, said side walls having support flanges adjacent upper marginal edges thereof for supporting lengthwise extending marginal edges of said second screen device whereby to support said second screen device in an essentially horizontally disposed relationship vertically below said top wall in a spaced essentially parallel relationship with an upper surface of said conveyor run, said one side wall having a support flange intermediate said marginal edges thereof and said support wall having a support flange adjacent an upper marginal edge thereof for supporting lengthwise extending marginal edges of said first screen device whereby to support said first screen device in a spaced essentially parallel relationship with a lower surface of said conveyor run;

heater means for heating said screen devices to within a range at which said screen devices emit substantial infra red radiation, whereby to impart heat to said food product during transport thereof through said tunnel, said heater means being mounted on said tunnel by means extending transversely of said tunnel adjacent lower marginal edges of said side and support walls, said heater means including a main gas burner arranged intermediate said one side wall and said support wall for directing a flame upwardly towards a lower surface of said first screen device and a secondary gas burner arranged intermediate said support wall and said other side wall for directing a flame upwardly towards a lower surface of said second screen device; and refractory material supported on said second screen device and spaced from said one side wall to define a flow opening in vertical alignment with said exhause port, said refractor material tending to constrain products of combustion from said heater means for passage through said second screen device substantially only in an area in vertical alignment with said flow opening.

7. A device according to claim 6, wherein valve means are provided to adjust the flow of combustible gas to said heater means, and sensor means are arranged to sense the temperature of said products of combustion passing through said exhaust port, said sensor means controlling said valve means to vary flow of combustible gas to said heater means inversely relative to sensed temperature.

8. A food product cooking device comprising in combination:

means defining an open ended horizontally elongated tunnel, said tunnel having an elongated exhaust port extending along one side thereof;

an endless open grid type belt conveyor having a horizontally disposed supporting run arranged to transport said food product lengthwise through said tunnel;

first and second metal screen devices arranged within said tunnel in a spaced essentially parallel relationship with lower and upper surfaces of said conveyor run, respectively, said second screen device extending horizontally transversely beyond said first screen device along a side of said tunnel spaced from said one side; and gas heater means for heating said screens to within a range at which said screens emit substantial infra red radiation, whereby to impart heat to said food product during transport thereof through said tunnel, said gas heater means being disposed relatively below said first screen device and arranged to apply a flame to a lower surface of said first screen device and to a lower surface of said second screen device in that area thereof extending beyond said first screen device.

9. A food product cooking device according to claim 8, wherein said gas heater means includes a main heater means extending lengthwise of said tunnel beneath said first screen device and a secondary heater means extending lengthwise of said tunnel beneath said area of said second screen device extending beyond said first screen device.

10. A food product cooking device according to claim 9, wherein said first screen device is coarsely woven and of light weight relative to said second screen device.

11. A food product cooking device comprising in combination:

means defining an open ended horizontally elongated tunnel, said tunnel having a vertically opening, elongated exhaust port extending along one side thereof;

an endless open grid type belt conveyor having a horizontally disposed supporting run arranged to transport said food product lengthwise through said tunnel;

first and second metal screen devices arranged within said tunnel in a spaced essentially parallel relationship with lower and upper surfaces of said conveyor run, respectively, said first screen device being coarsely woven and of light weight relative to said second screen device; and heater means for heating said screens to within a range at which said screens emit substantial infra red radiation, whereby to impart heat to said food product during transport thereof through said tunnel, said heater means including a main gas heater arranged to apply a flame to a lower surface of said first screen device and a secondary gas heater arranged to apply a flame to a lower surface of said second screen device along a marginal portion thereof extending along a side of said tunnel spaced transversely from said one side, said tunnel tending to constrain products of combustion from said heater means for passage through said second screen device substantially only in an area thereof in alignment with said exhaust port.

12. A food product cooking device comprising in combination:

means defining an open ended horizontally elongated tunnel, said tunnel having a pair of lengthwise extending side walls, a top wall means joining said side walls and defining an elongated exhaust port extending lengthwise of said tunnel;

an endless open grid type belt conveyor having a horizontally disposed supporting run arranged to transport said food product lengthwise through said tunnel;

first and second metal screen devices arranged within said tunnel in a spaced essentially parallel relationship with lower and upper surfaces of said conveyor run, respectively, said first screen being coarsely woven and of light weight relative to said second screen device; and gas heater means for heating said screens to within a range at which said screens emit substantial infra red radiation, whereby to impart heat to said food product during transport thereof through said tunnel, said heater means including a gas heater arranged to apply a flame to a lower surface of said first screen device and another gas heater arranged to apply a flame to a lower surface of said second screen device along a marginal portion thereof extending lengthwise of said tunnel, said top wall means including refractory material disposed to rest on said second screen device and tending to constrain products of combustion from said heater means for passage through said second screen device substantially only in an area thereof in vertical alignment with said exhaust port, and said area of said second screen device being spaced transversely of said tunnel from said marginal portion thereof.

* * * * *